Sept. 16, 1952 W. H. ATKINSON 2,610,529
BORING HEAD
Filed July 5, 1950

William H. Atkinson
INVENTOR.

BY
Attorneys

Patented Sept. 16, 1952

2,610,529

UNITED STATES PATENT OFFICE 2,610,529

BORING HEAD

William H. Atkinson, Jackson, Miss., assignor of one-third to L. M. Conkwright, Oklahoma City, Okla.

Application July 5, 1950, Serial No. 172,080

5 Claims. (Cl. 77—68)

This invention comprises novel and useful improvements in boring heads, and more particularly pertains to a boring head which will cut an axial guide core in the member which is being drilled.

An important object of this invention is to provide a boring head which will more accurately and with greater facility cut a bore in a member.

Another important object of this invention is to provide a boring head, in accordance with the foregoing objects, which will cut an axial guide core in a member whereby the volume of material being cut, for a given sized bore, will be reduced, thereby reducing the energy required to drill the bore, and which guide core will also serve to guide the head axially through the member.

Yet another object of this invention is to provide a boring head, in accordance with the foregoing objects, in which a tubular boring stem which is attached to the head will receive the guide core and also provide a conduit for lubricant to the boring head cutter.

An important feature of this invention resides in the provision of a boring head having a plurality of circumferentially spaced ribs, with cutters carried by each rib and a lubricating bore extending longitudinally of the ribs for cooling the cutters, and which head has an axial guide bore therein and a tubular drill stem attached to the head and having an internal diameter greater than that of the guide bore, the lubricating bore communicating with the stem, whereby a guide core in a member cut by the boring head will be snugly received in the guide bore of the head, but will be spaced from the walls of the drill stem, so that lubricant may be forced between the stem and the guide core, into the lubricating bores and out through the forward end of the cutting head.

Another important feature of this invention resides in the provision of a boring head having an axial guide bore therein, with a guide bushing disposed in the guide bore, and cutters detachably mounted in the head and engaging the bushing, to limit movement of the bushing relative to the head.

Still another feature of this invention resides in the provision of a boring head having a plurality of circumferentially spaced ribs, with cutters carried by the ribs, and a recess in the ribs rearwardly of the cutters, and vibration dampening blocks disposed in the recess for engaging the inner surface of the bore being cut by the boring head.

These, together with various ancillary objects and features, are attained by this device, a preferred embodiment of which has been illustrated by way of example only in the accompanying drawings, wherein.

Figure 1:
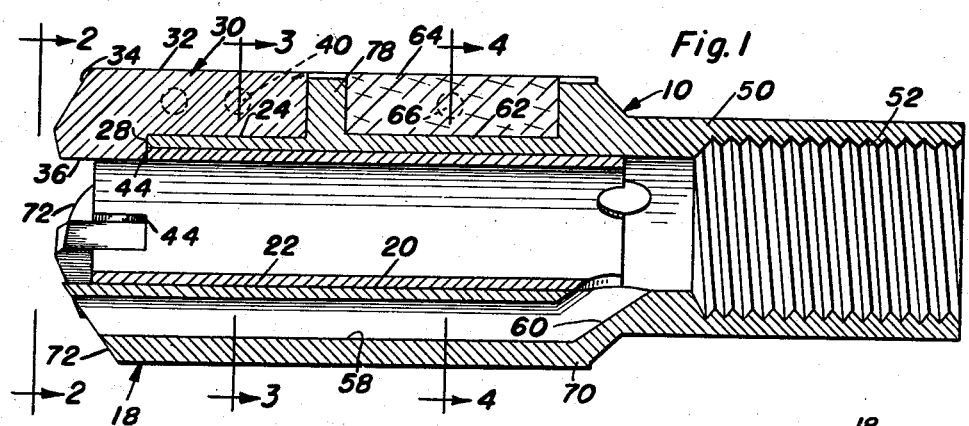
Figure 1 is a longitudinal sectional view of the boring head.

It has been found that an elongated member may be more accurately bored if there is utilized a boring head which will form an axial guide core in the member being bored, which guide core will guide the head during the boring operation. It has further been found that the using of such a boring head reduces the amount of power necessary to produce a given drilling operation, since, as will be readily appreciated, a lesser volume of material must be cut and removed by the cutters when an axial guide core is formed, than is cut and removed when no guide core is formed.

There has accordingly been provided a boring head, indicated generally by the numeral 10, and shown in the accompanying drawings to which reference is now made, and in which like numerals designate similar parts throughout the various views. The boring head 10 has a plurality of circumferentially spaced, and substantially V-shaped chip flutes 12 having a leading edge 14 and a trailing edge 16. As will be appreciated from a consideration of the accompanying drawings, the leading and trailing edges of adjacent flutes define ribs 18 therebetween.

The head 10 is also provided with an axial bore 20, in which is disposed a bushing 22, and which bushing extends substantially the entire length of the rib 18.

Each of the ribs 18 is provided with a longitudinally extending slot 24, adjacent the forward end thereof, which slot opens forwardly and outwardly of the boring head 10, and which slots terminate in spaced relation to the guide bore 20, and defining an inner wall 26 therebetween. For reasons which will later become apparent as the following description proceeds, the head 10 is also traversely grooved, as at 28, adjacent the forward cutting end of the head 10, which groove communicates the slots 24 with the guide bore 20.

A substantially V-shaped cutter 30 having an arcuate outer reaming edge 32, a forward cutting edge 34, and an inner reaming edge 36 is disposed in the slot 24, the outer reaming edge 32 terminating substantially flush with the arcuate outer surface 38 of the rib 18, while the inner reaming edge 36 terminates flush with the inner surface of the bushing 22. The cutter 30 is detachably secured in the slot 24, by means of set screws 40 which are threadedly received in bores 42, and which bores extend through a portion of the ribs 18, to communicate the slots 24 with the chip flutes 16. As will be readily appreciated, the cutters 30 may be either detached from, or longitudinally adjusted in the slots, by merely loosening the set screws 40.

It is further intended that the bushing 22 be provided with transverse recesses 44, adjacent the forward end thereof, the cutters 30 extending through the recesses whereby the bushing will be constrained by the cutters from rotary or outward movement relative to the head 10. Further, since the inner cutting surface 36 terminates even with the inner surface of the bushing 22, it will be appreciated that the guide core such as 46 which is formed in the elongated member 48 which is bored, will be snugly received within the bushing 22 whereby the head will be guided axially during the boring operation.

The boring head 10 has an extension 50, having a relatively reduced external diameter formed integrally therewith, and which extension is provided with an internally threaded counterbore 52 to receive a correspondingly externally threaded drill stem 54, the internal diameter of the bore 56 in the drill stem 54 being substantially equal to that of the bore 20.

Figure 5:
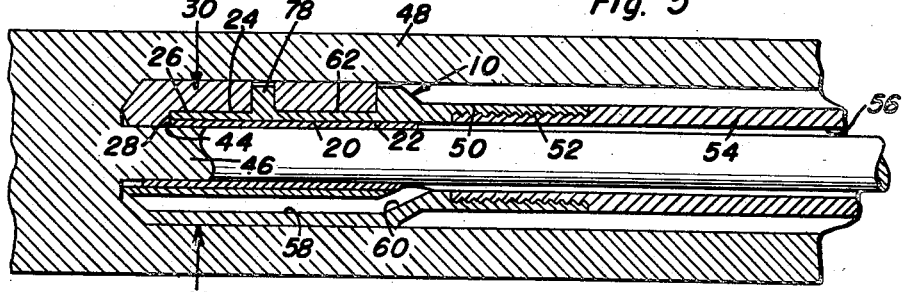
Figure 5 is a frgamentary longitudinal sectional view of the boring head, shown cutting a member and forming an axial guide core.
Figure 6:
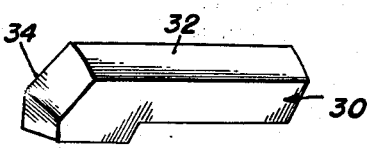
Figure 6 is a perspective elevational view of one of the cutters.

The ribs 18 are also provided with longitudinally extending lubricant bores 58 therein, which bores communicate with the inner bore 20 of the head 10, preferably rearwardly of the bushing 22, and for this purpose the bore 58 is provided with an inwardly extending offset portion 60, as is clearly apparent from a consideration of Figures 1 and 5. Since the bore 56 in the drill stem 54 and the guide bore 20 in the head 10 are of substantially the same diameter, and since the bushing 22 is positioned in the bore 20, forwardly of the point at which the lubricating bores 58 communicate with the bore 20, it will be appreciated that lubricant may be forced through the bore 56, and around the guide core 46 through the lubricating bores 58 to the forward cutting surfaces 34 of the cutters 30.

Figure 4:
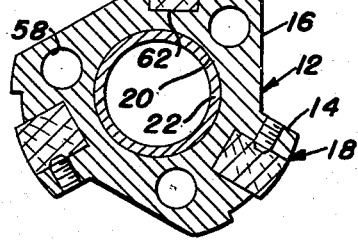
Figure 4 is a transverse sectional view, taken substantially on the plane 4—4 of Figure 1.

The head 10 is also provided with longitudinal slots 62, in the ribs 18 thereof, which slots are positioned preferably rearwardly of the cutters 30, and which slots detachably receive vibration dampening blocks 64 which are locked into position by means of set screws 66, as is clearly shown in Figure 4 of the drawings. It is intended that these blocks also have an arcuate outer surface 68 which is adapted to be guidingly received by the inner surface of the bore which is being cut, and through the member 48 to prevent the head 10 from vibrating within the bore. Additionally, each of the ribs 18 may be provided with an arcuate ridge 70, which may be of a relatively harder metal than that of the head 10, and which may be molded, welded or secured to the head 10 as is desired.

Figure 2:
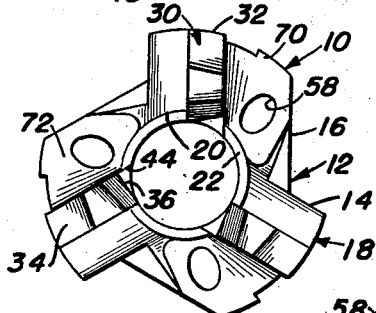
Figure 2 is an end elevational view of the boring head taken substantially upon the plane indicated by the line 2—2 of Figure 1.
Figure 3:
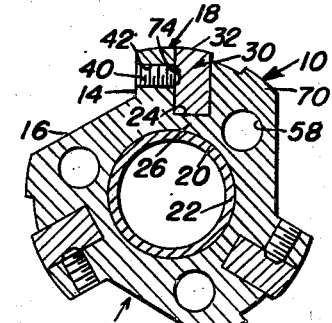
Figure 3 is a transverse sectional view, taken substantially on the plane 3—3 of Figure 1.

The ribs 18, adjacent the forward ends thereof are beveled outwardly and rearwardly, as shown in Figures 1 and 2 of the drawings as at 72 so as to permit the free passage of chips cut by the cutters 30.

In order to more firmly lock the cutters 30, and also the blocks 64 in their respective slots in the cutting head 10, both or either of the cutters and the blocks may be provided with longitudinal recesses 74 and 76 in the cutters and blocks respectively, whereby outward movement of the cutters and blocks relative to the slots, when their respective set screws are in position, will be prevented. Additionally, it will be appreciated that a set screw may be disposed through the wall 78 which separates the slots 62 and 24, which set screw could be adjusted to advance or retard the cutters 30, as the latter become worn.

From the foregoing, it is thought that the operation and construction of the device will be readily understood, and further discussion is therefore believed to be unnecessary. However, since numerous modifications will readily occur to those skilled in the art after a consideration of the foregoing specification and accompanying drawings, it is not intended to limit the invention to that shown and described, but all suitable modifications may be resorted to falling within the scope of the appended claims.

Having described the invention, what is claimed as new is:

1. A boring head comprising an elongated body having a plurality of chip flutes therein and a rib between each of said flutes, said body having an axial guide bore therein and a bushing disposed in said bore and terminating adjacent the tip of said body, said bushing having circumferentially spaced notches in the end thereof adjacent the tip of said body, a cutter carried by each of said ribs and having a cutting tip extending from the outer surface of said ribs to the inner surface of said bushing to form an undrilled axial guide core in the member being drilled, said cutting tips extending into said notches and engaging said bushing to limit rotary and outward movement of said bushing relative to said body.

2. A boring head comprising an elongated body having a plurality of chip flutes therein and a rib between each of said flutes, said body having an axial guide bore therein and a bushing disposed in said bore and terminating adjacent the tip of said body, a cutter carried by each of said ribs and having a cutting tip extending from the outer surface of said ribs to the inner surface of said bushing to form an undrilled axial guide core in the member being drilled, said cutting tips engaging said bushing to limit movement thereof, a drill stem attached to said head and having an axial bore therein in aligned communication with said guide bore in said body, said ribs having lubricant bores extending longitudinally thereof and communicating with said bore in said stem, said bushing having a lesser inner radius than that of said bore in said stem whereby lubricant may flow through said stem about a guide core extending therethrough and through said lubricant bores in said ribs.

3. The combination of claim 2 wherein said lubricant bores open at the forward ends of said ribs.

4. The combination of claim 3 wherein said cutters are detachably secured to said ribs.

5. The combination of claim 4 including guide blocks attached to said ribs rearwardly of said cutters.

WILLIAM H. ATKINSON.

REFERENCES CITED

The following references are of record in the file of this patent:

UNITED STATES PATENTS

| Number | Name | Date |
|---|---|---|
| 496,253 | Federschmidt | Apr. 25, 1893 |
| 1,940,220 | McGrath | Dec. 19, 1933 |
| 2,188,631 | Kraus | Jan. 30, 1940 |
| 2,412,939 | Aston | Dec. 24, 1946 |